(12) United States Patent
Franklin et al.

(10) Patent No.: US 10,844,611 B2
(45) Date of Patent: Nov. 24, 2020

(54) BUILDING PANEL LEVELING SYSTEM

(71) Applicants: Michael Sean Franklin, Fort Worth, TX (US); Thomas Merle Shingler, Plano, TX (US)

(72) Inventors: Michael Sean Franklin, Fort Worth, TX (US); Thomas Merle Shingler, Plano, TX (US)

(*) Notice: Subject to any disclaimer, the term of this patent is extended or adjusted under 35 U.S.C. 154(b) by 330 days.

(21) Appl. No.: 15/776,074

(22) PCT Filed: Nov. 14, 2016

(86) PCT No.: PCT/US2016/061811
§ 371 (c)(1),
(2) Date: May 14, 2018

(87) PCT Pub. No.: WO2017/083815
PCT Pub. Date: May 18, 2017

(65) Prior Publication Data
US 2020/0256063 A1 Aug. 13, 2020

Related U.S. Application Data

(60) Provisional application No. 62/255,479, filed on Nov. 15, 2015.

(51) Int. Cl.
*E04F 13/12* (2006.01)
*E04F 13/08* (2006.01)
(52) U.S. Cl.
CPC .......... *E04F 13/12* (2013.01); *E04F 13/0803* (2013.01); *B32B 2607/00* (2013.01);
(Continued)

(58) Field of Classification Search
CPC .............. E04F 13/12; E04F 13/0803; E04F 2201/0138; E04F 2201/0153; E04F 13/0889; B32B 2607/00
See application file for complete search history.

(56) References Cited

U.S. PATENT DOCUMENTS 4,483,122 A * 11/1984 Crandell ............. E04F 13/0889
52/235
4,768,321 A * 9/1988 Crandell ............. E04F 13/0808
52/235

(Continued)

*Primary Examiner* — Joshua K Ihezie
(74) *Attorney, Agent, or Firm* — Guy V. Manning

(57) ABSTRACT

A building panel offset adjustment and leveling system permits precise mounting of panel extrusion channels, and thereby the panels, onto the surface of a building. In a particular embodiment, a slotted spool race along the under surface of each extrusion channel mates with a threaded spool having a first flange slidably received within the spool race and a second flange coupled to the first flange by a threaded collar. The second flange articulates between a proximate position closest to the race and a distal position, providing a continuous offset adjustment range between said extrusion channel and the building. In one or more alternate embodiments, columns of coaxially mated shims replace the spool and provide incremental, graded offset adjustment. In each embodiment, a hollow bore through the offset adjustment system accepts a fastener which affixes the extrusion channel to the building and clamps the adjustment system into its selected offset position.

16 Claims, 11 Drawing Sheets

(52) U.S. Cl.
CPC ... *E04F 13/0889* (2013.01); *E04F 2201/0138* (2013.01); *E04F 2201/0153* (2013.01)

(56) References Cited

U.S. PATENT DOCUMENTS

| | | | | |
|---|---|---|---|---|
| 5,522,193 | A * | 6/1996 | Sommerstein | E04F 13/081 52/235 |
| 5,893,245 | A * | 4/1999 | Sekiguchi | E04F 13/0816 403/295 |
| 6,098,364 | A * | 8/2000 | Liu | E04F 13/0855 52/235 |
| 6,484,465 | B2 * | 11/2002 | Higgins | E04F 13/081 52/235 |
| 6,748,709 | B1 * | 6/2004 | Sherman | E04B 2/96 52/235 |
| 8,166,716 | B2 * | 5/2012 | Macdonald | E04F 13/0826 52/235 |
| 8,745,941 | B2 * | 6/2014 | Macdonald | E04F 13/0825 52/235 |
| 8,875,467 | B2 * | 11/2014 | Anastasi | E04F 13/0807 52/379 |
| 9,068,358 | B2 * | 6/2015 | MacDonald | E04F 13/0805 |
| 9,091,079 | B2 * | 7/2015 | Wright | E04F 13/0816 |
| 9,567,752 | B2 * | 2/2017 | McCandless | E04F 13/0807 |
| 9,777,486 | B1 * | 10/2017 | Simonsen | E04F 13/0801 |
| 9,803,372 | B2 * | 10/2017 | Griffiths | E04F 13/083 |
| 9,850,666 | B2 * | 12/2017 | Libreiro | E04F 13/0848 |
| 2007/0022682 | A1 * | 2/2007 | Morgenegg | E04B 2/90 52/235 |
| 2009/0241444 | A1 * | 10/2009 | Griffiths | E04F 13/0889 52/235 |
| 2010/0186343 | A1 * | 7/2010 | MacDonald | E04F 13/12 52/747.1 |
| 2015/0052840 | A1 * | 2/2015 | Beaty | E04B 2/16 52/483.1 |

* cited by examiner

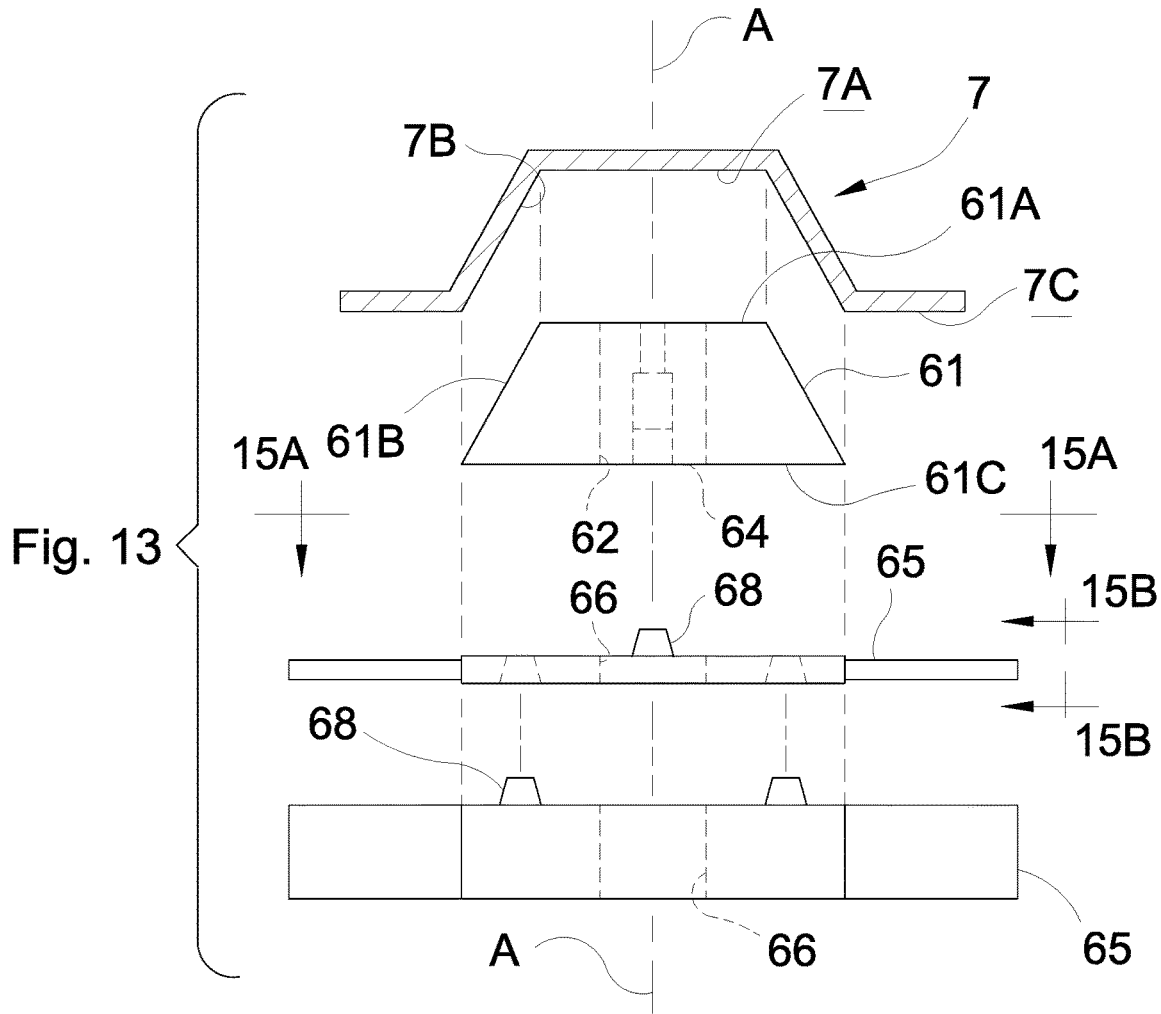
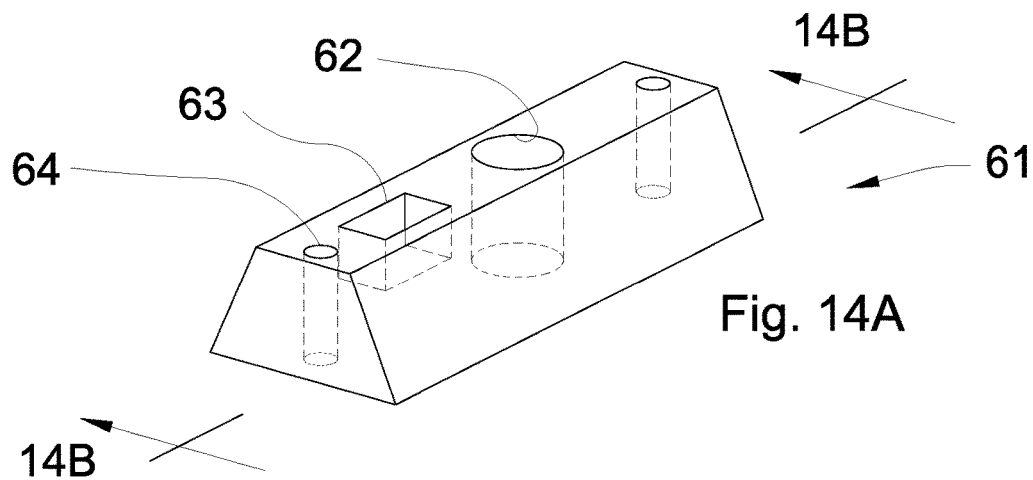

BUILDING PANEL LEVELING SYSTEM

BACKGROUND OF THE INVENTION

1. Field of the Invention

This invention relates generally to panel sections serving as skins for buildings or other structures, and particularly to mounting systems for such panel sections. More particularly, this invention relates to means within such mounting systems for mitigating irregularities in building surfaces to make such panel sections appear to be a seamless building skin. Still more particularly, this invention relates to apparatus and procedure for offsetting and levelizing attachment points for such panel sections and their mounting systems.

2. Description of Related Art

Building skins typically are fabricated in unitary, usually rectangular panels to be arrayed across the surface of a building under construction or refurbishment. In either case, a mounting system first is attached to the building and then the panels are hung on the mounting system. The mounting system comprises subgirts, or plates, arrayed in a grid pattern across the building walls, the subgirts being attached directly to and following the contour of the building surface. The subgirts provide one or more face flanges spaced away from the building to which the panels couple.

Panels typically comprise planar sheets of metal or other material having a flat face and short perpendicular sides, or legs. Panel edge brackets riveted to the panel legs provide grooves, or channels, opening outward from the panels. A mounting track adapted to span between the edge channels of two adjacent panels straddles the gap and provides an attachment system which couples to the subgirt face flanges. Means for adjusting the spacing between the extrusion channels and the subgirt face flanges is required to keep the panels from following the contour of the building. Typically, shims or offset brackets of various lengths provide the spacing means.

Considerable installer judgment goes into selecting the thickness and offset amount for each support point. Typically, a theoretical panel plane passes through a base point on the building, the base point defining the most outwardly extending irregularity in the building surface. At the base point, the extrusion channel theoretically could attach directly to the subgirt face flanges. Shims or offset brackets of varying lengths as needed attach at other points on the grid to keep the panels lying within the theoretical panel plane. Installation is considerably slowed by the need to carry or retrieve an array of shims or offset brackets of various lengths. A need exists for a single offset device which replaces a plurality of shims and offset brackets of various lengths.

Scanning systems and computer software have been developed for surveying a building surface, identifying said base point and then calculating each other mounting point and the shim thickness or offset bracket required for that point. Though it helps the installer in the logistics of selecting offset brackets for each mounting point, such scanning and surveying is an inexact science at best. A need exists for improved offset adjustment techniques and apparatus in the panel mounting process.

SUMMARY OF THE INVENTION

A building panel offset adjustment and leveling system permits precise mounting of panel extrusion channels, and thereby the panels, onto the surface of a building. In a particular embodiment, a slotted spool race along the under surface of each extrusion channel mates with a threaded spool having a first flange slidably received within the spool race and a second flange coupled to the first flange by a threaded collar. The second flange articulates between a proximate position closest to the race and a distal position, providing a continuous offset adjustment range between said extrusion channel and the building. In one or more alternate embodiments, columns of coaxially mated shims replace the spool and provide incremental, graded offset adjustment. In each embodiment, a hollow bore through the offset adjustment system accepts a fastener which affixes the extrusion channel to the building and clamps the adjustment system into its selected offset position.

BRIEF DESCRIPTION OF THE DRAWINGS

The novel features characteristic of the present invention are set forth in appended claims. The invention itself, as well as a preferred mode of use and further objects and advantages thereof, will best be understood by reference to the following detailed description of one or more illustrative embodiments when read in conjunction with the accompanying drawings, wherein:

FIGS. 13-15B illustrate a third particular embodiment of the present invention.

DESCRIPTION OF A PREFERRED EMBODIMENT

Figure 1:
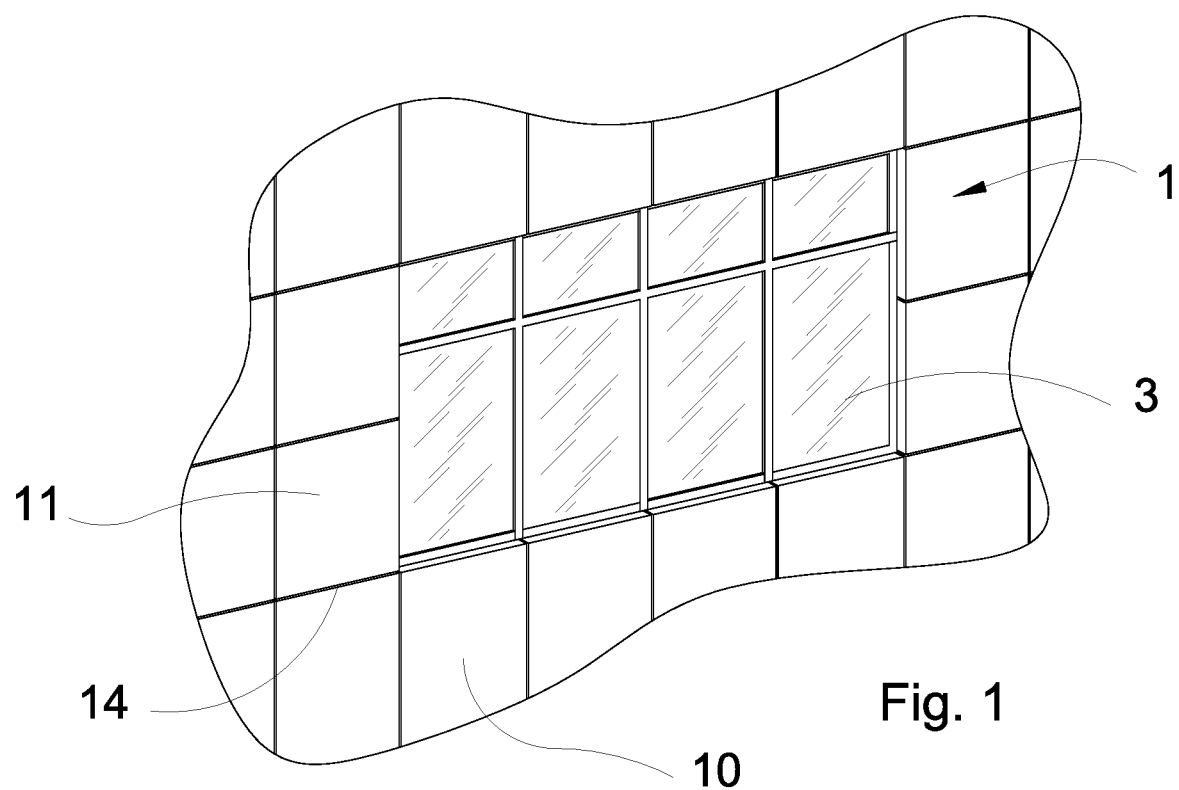
FIG. 1 shows a portion of a typical building wall covered by a skin of prefabricated panels.
Figure 2:
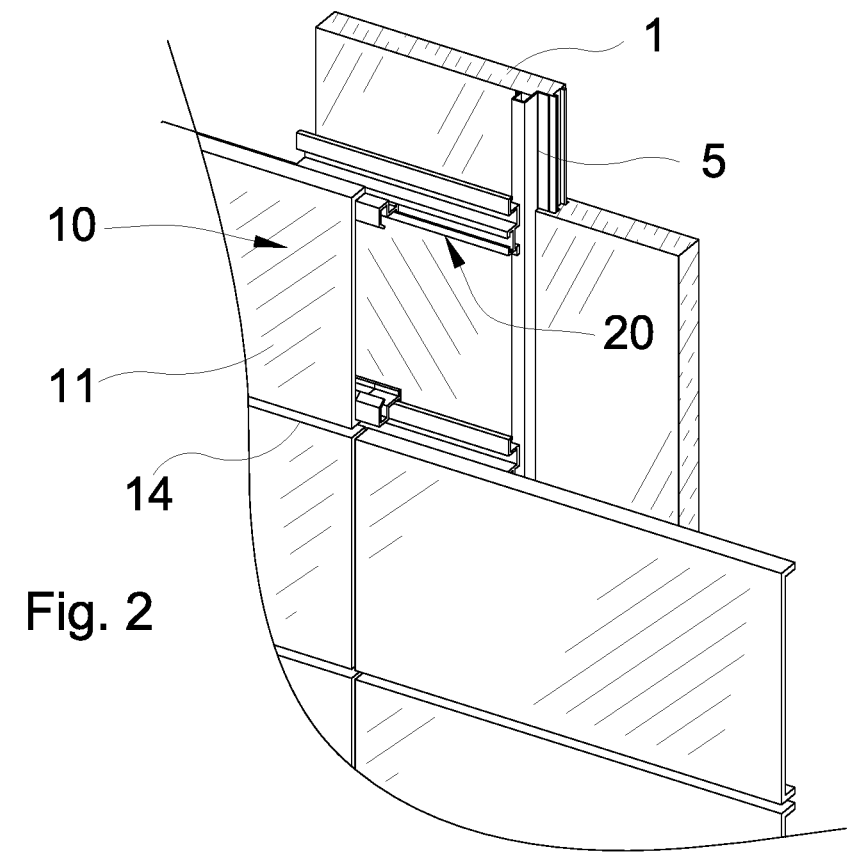
FIG. 2 illustrates how the prefabricated panels of FIG. 1 commonly attach to the building.
Figure 3A:
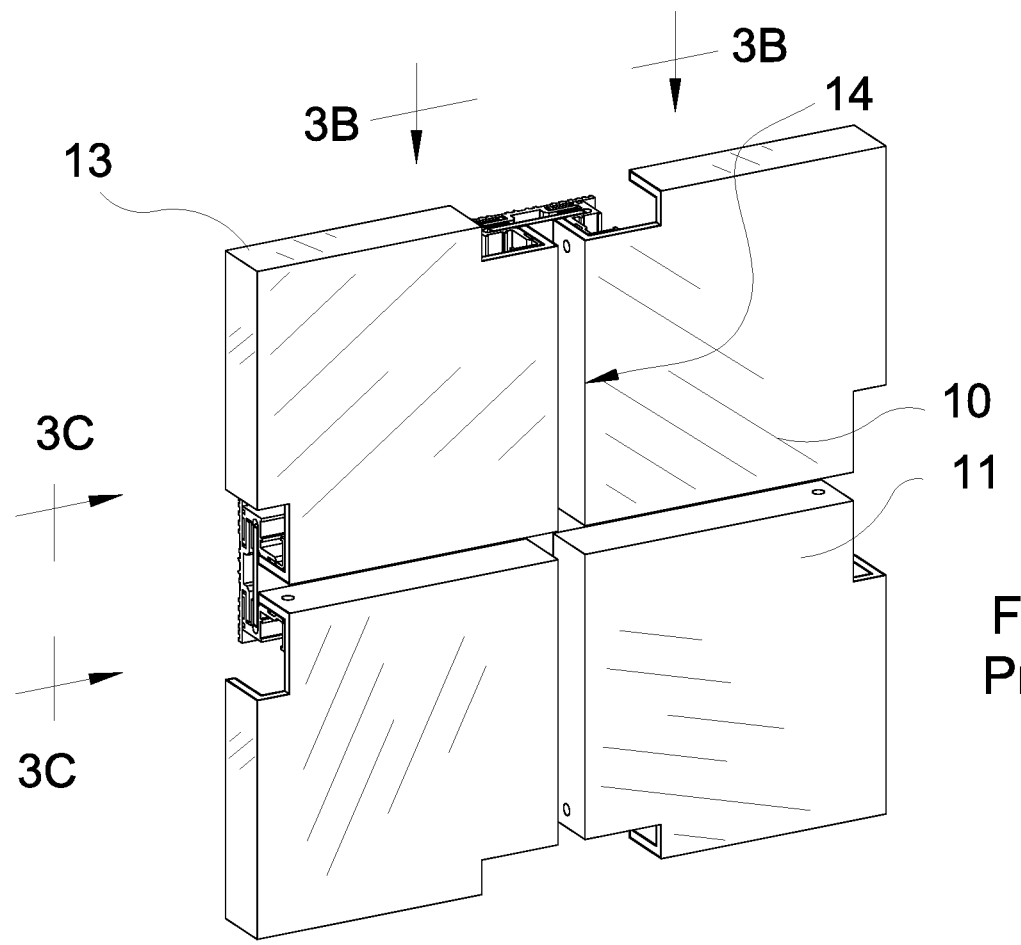
FIGS. 3A-3C detail in partial perspective the elements of a common panel attachment system, the views of FIGS. 3B, 3C indicated in FIG. 3A.
Figure 3B:
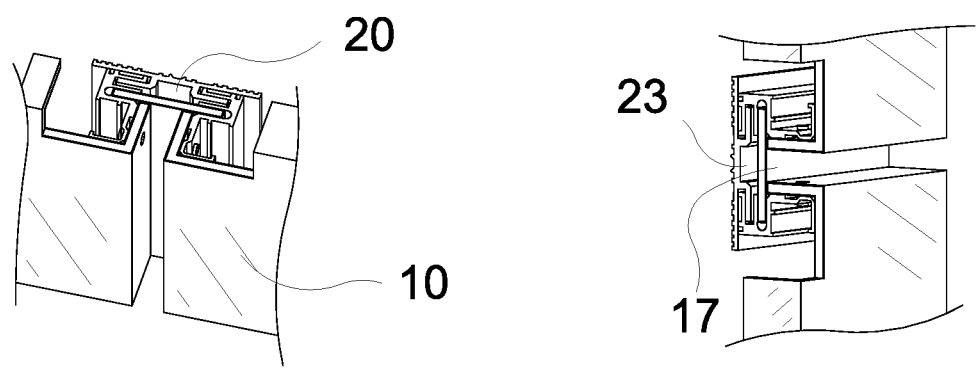
Figure 3C:
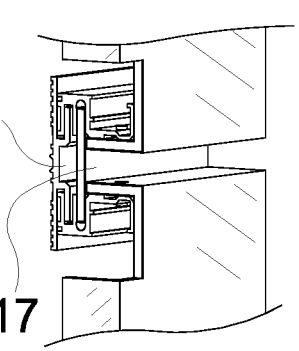

Referring now to the figures, and particularly to FIGS. 1-2, building 1 having windows 3 comprises one of a large number of types of structures onto which panels 10 may be mounted. Building 1 clad with a skin of panels 10 exhibits a smooth, modern appearance often sought by architects and building owners.

Building 1 may comprise planar or curved walls or a combination of both, and it may be a short building or a skyscraper. Building 1 may be a structure intended to be occupied by people, or it may be a monument, tower or other structure. Building 1 may be new and designed originally to be clad with a skin of panels 10, or it may be an older building being refurbished with a new panel skin. A project to clad building 1 with panels 10 may include the entire exterior surface or it may include only a portion thereof. One having ordinary skill in the art will recognize that the present invention contemplates all such variations.

Panels 10 typically are fabricated from planar, usually rectangular sheets, referred to as aluminum composite materials (ACM) or metal composite materials (MCM). Panels 10 have a synthetic core sandwiched between two metallic outer layers, the outer layers commonly being aluminum for its strength, configurability and aesthetic appearance. Hereinafter, panels 10 shall be referred to interchangeably as ACM, MCM and composite panels, or simply panels 10. One having ordinary skill in the art will recognize that the term panels 10 refers to all such alternative materials. One having ordinary skill in the art also will recognize that panels 10 may be of any shape and not just rectangular.

Turning now also to FIGS. 3A-5, panels 10 further comprise front surface, or face 11, surrounded at its perimeter by comparatively short edges or legs 13 which give panel 10 a geometric stability and rigidity which keeps faces 11 smooth and flat and provide means for attaching panels 10 to building 1. Gaps 14 separate adjacent panels 10 along all their edges 13, and exist as a consequence of the installation process. The mounting apparatus holding panels 10 to building 1 is accessible through gaps 14 during installation. Filler strips 17 (see FIGS. 3-5), commonly made of the same ACM/MCM material as panels 10, span gaps 14 to cover the mounting apparatus and provide a smooth, clean appearance to the ACM clad skin of building 1.

Panels 10 attach to building 1 at one or more points along gaps 14. Spanning gap 14 beneath or behind filler strip 17, extrusion track 23 affixes by fastener 25 to a substrate layer of building 1 at its wall surface 4. Subgirt extension brackets 5 (see FIG. 5) may be required to extend between track 23 and wall surface 4 because of variations in the wall surface 4, as discussed in more detail below. One having ordinary skill in the art will recognize that the skin erected onto building 1 ideally comprises a smooth, even surface despite any irregularities or variations which may exist in wall surface 4.

Riveted along the entire length of each of legs 13 of panels 10, panel leg channels 21 provide not only additional rigidity to panels 10 but means by which panels 10 attach to track 23. Leg channels 21 may vary in configuration (compare, e.g., FIGS. 4, 5) but have in common two elements: leg attachment portion 21A riveted directly to leg 13 and track interface portion 21B adapted to interface with appendages on track 23 for affixing panels 10 to track 23.

During installation, leg channels 21 are riveted to legs 13. Panels 10 then are lifted into place adjacent track 23. Track interface portion 21B slidably mates with track race 24 of track 23 onto which one or more other panels 10 already have been installed. Second track 23 may have been riveted to track interface portion 21B on the opposite side (e.g. the upper edge 13) of panel 10. Once panel 10 is in place, it is affixed to building 1 by inserting track fastener 25 through track 23, either directly into building 1 (FIG. 4) or into subgirt 5 already installed onto wall surface 4.

Figure 6:
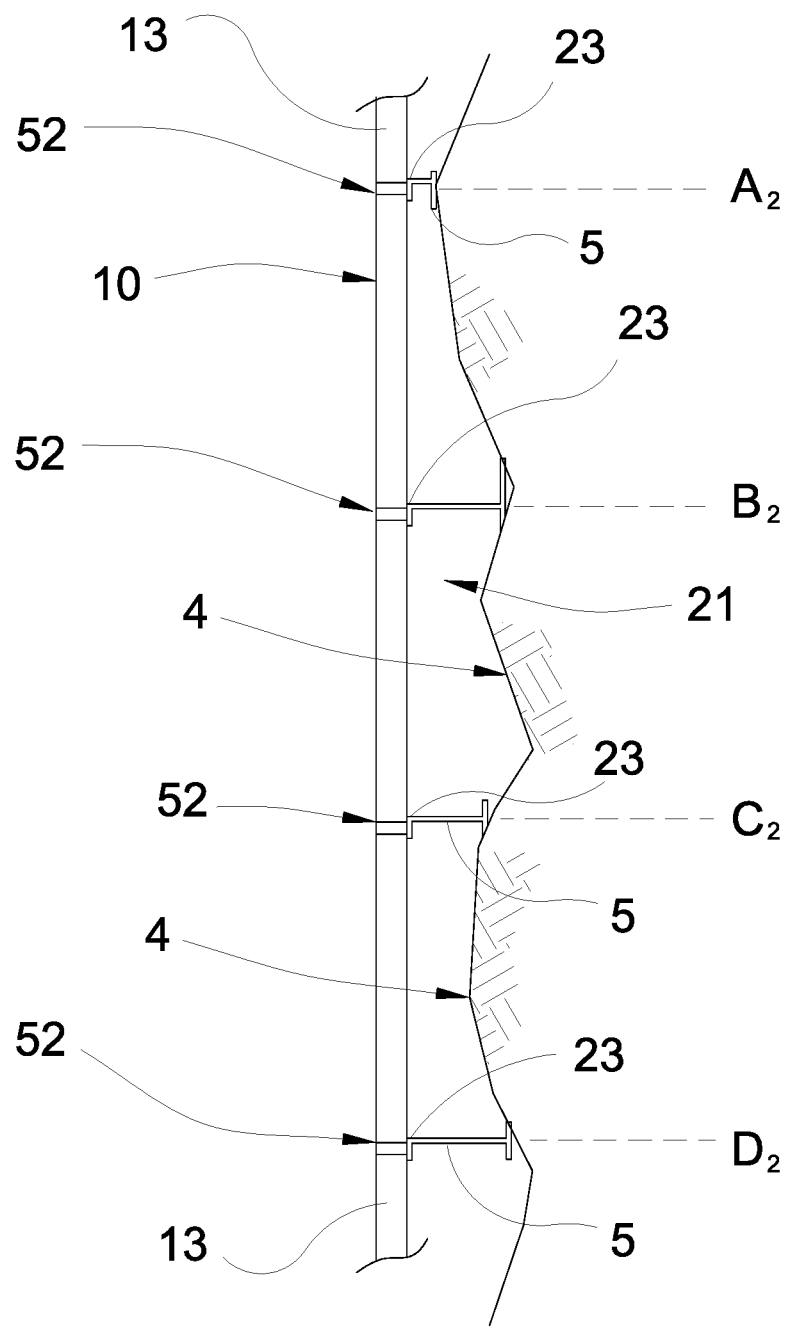
FIGS. 6 and 7 detail the common variability of a wall of the building shown in FIG. 1, and illustrate one method of measuring the wall of FIG. 6 for installation of panels.

Turning now also to FIG. 6, a schematic cross section through wall 2 of building 1 shows in greatly exaggerated manner variations that can occur in surface 4 of wall 2. For a planar wall 2 of building 1, however, front faces 11 of panels 10 must occupy a single, substantially continuous plane rather than exhibiting undulations or variations that reflect the irregularity of wall surface 4. To achieve this, subgirt brackets 5 span between a solid surface 4 of wall 2 and tracks 23 affixed to panels 10. As best seen in FIG. 6, this in turn requires a variety of spacers (not shown) or varying sizes of brackets 5 to compensate for the irregularities of surface 4 of wall 2. This typically is handled in one of two ways: by inserting one or more shims (not shown) between track 23 and bracket 5, or by providing a variety of brackets 5 of varying sizes (as illustrated in FIG. 6). Preferably, various sized brackets 5 are utilized, and only one or two thin shims are required, if at all. However, providing various sized brackets 5 can be logistically difficult if surface 4 of wall 2 varies greatly from one attachment point to the next.

Figure 7:
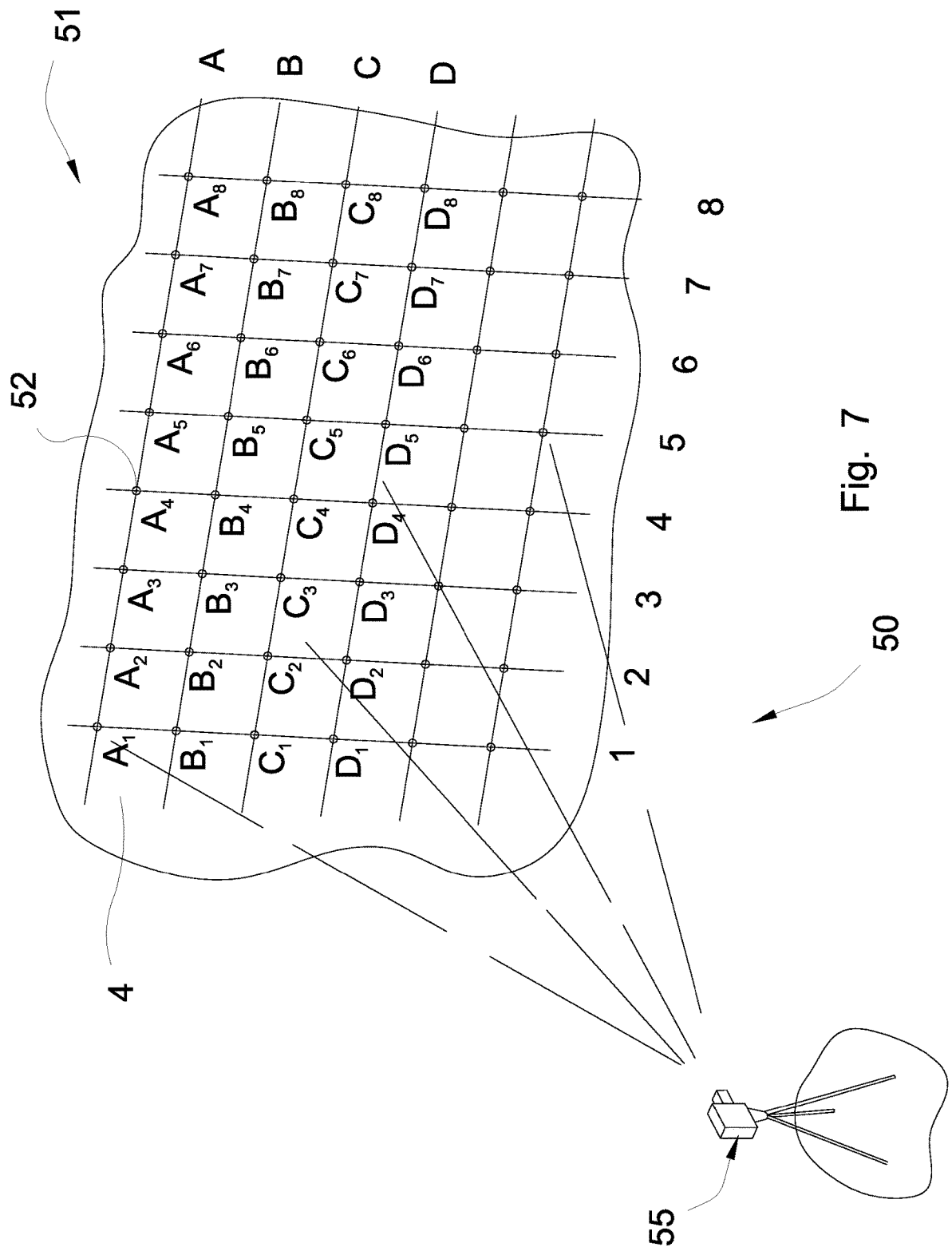

Referring now also to FIG. 7, a system is shown for anticipating and managing the inevitable variations in wall 2 illustrated in FIG. 6. A stylized section of wall surface 4 is superimposed with regular grid 51 labeled with rows A-F (and continuing as needed) and columns 1-7 (and continuing as needed). The intersection points 52 of rows and columns are labeled by the letter/number combination of the rows and columns intersecting there. In such fashion, a map of wall segment 4 can be made. In one embodiment, intersection points 52 comprise the locations of corners of panels 10 where attachments are to be made between tracks 23 and wall 2, as discussed above.

Three dimensional (3D) scanning system 50 comprises a camera and laser system 55 capable of remote measurement of the horizontal variations in wall surface 4 illustrated by FIG. 6. System 50 builds a database of points 52, the database including not only the location of each point 52, but the deviation from a selected maximum outward deviation of point 52 from wall surface 4 As best seen in FIG. 6, such maximum outward deviation occurs at the attachment point 52 corresponding to the point labeled A2. Presuming point A2 is the base point of contact between the skin created by panels 10 and wall surface 4, then all other points 52 can be measured and calculated in reference to point A2. A table of such deviations might appear as the example shown in Table 1, with as many cells as needed to map wall surface 4 for the number of panel attachment points 52 needed to attach panels 10 across the entirety of wall 2.

TABLE 1

Wall deviations and offsets

|   | (1)  | (2)  | (3)  | (4)  |
|---|------|------|------|------|
| A | −0.1 | 0.0  | −0.2 | −0.3 |
| B | −0.2 | −0.8 | −0.1 | −0.1 |
| C | −0.1 | −0.4 | −0.4 | −0.3 |
| D | −0.3 | −0.6 | −0.2 | −0.3 |

One having ordinary skill in the art will recognize that the units of Table 1 could be in fractions of an inch, centimeters or other units of measurement without departing from the spirit and scope of the present invention.

A suitable 3D scanning system 50 is Faro Focus 3D Scanner available from Faro Technologies of Lake Mary, Fla. USA. A suitable software for analyzing the data generated by such 3D scanning systems is Faro Scene, also available from Faro Technologies of Lake Mary, Fla., USA, or Leica Cyclone available from Leica Geosystems, Inc. of Norcross, Ga., USA.

Figure 8:
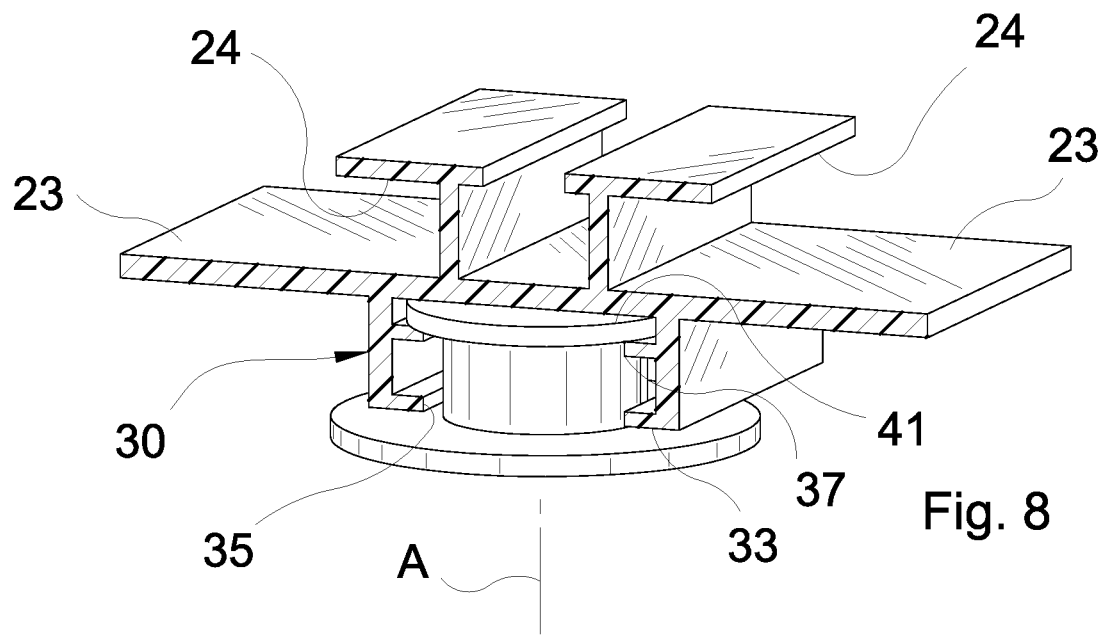
FIGS. 8 and 9 show in alternative states a particular embodiment of the panel leveling system of the present invention.
Figure 9:
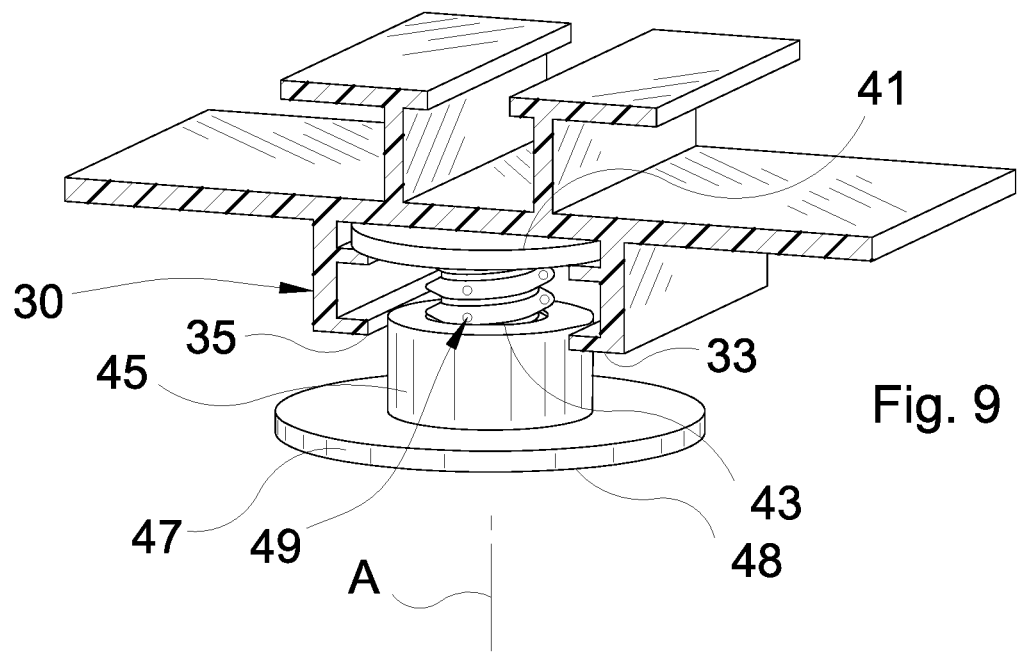
Figure 10:
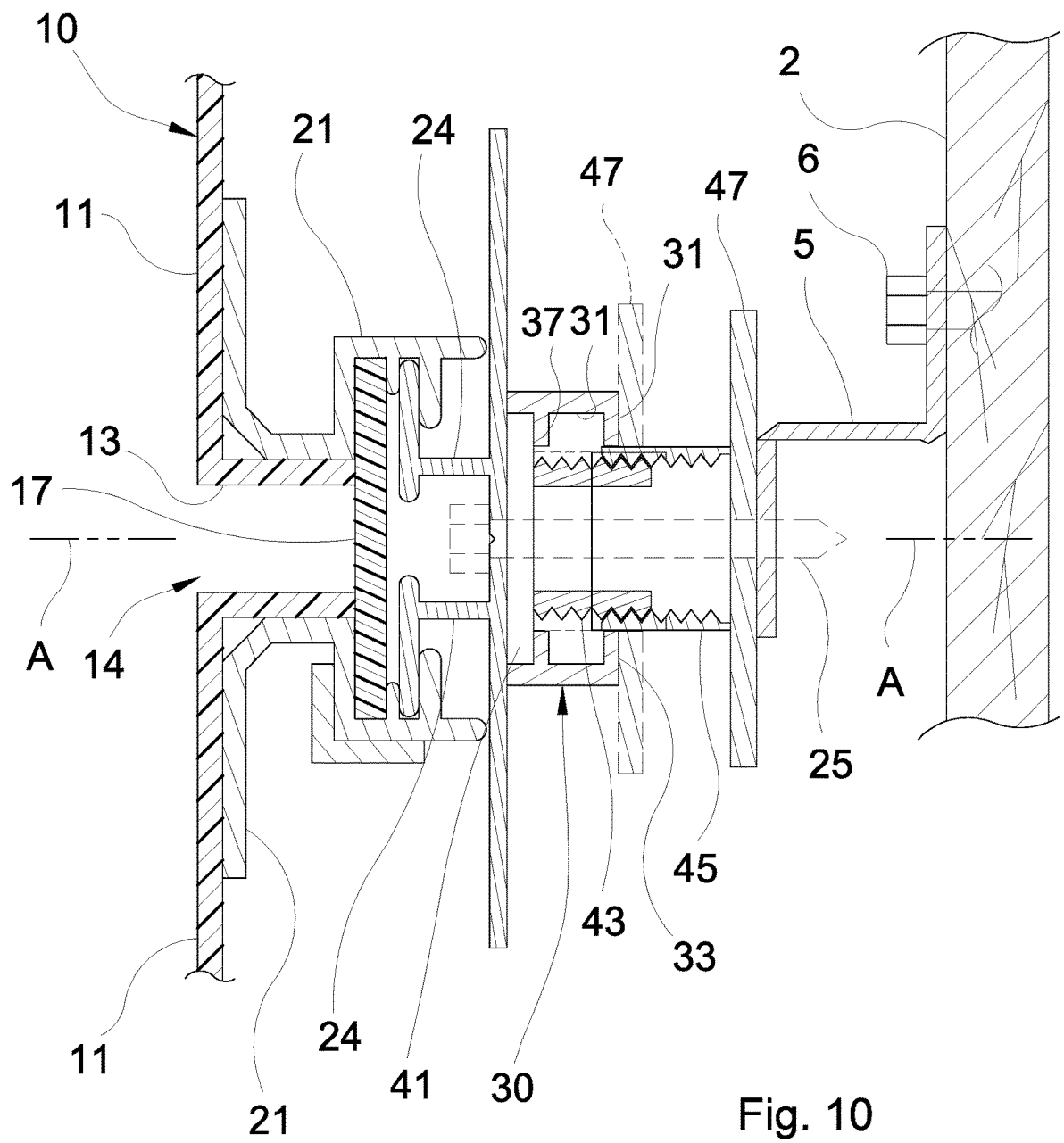
FIG. 10 details in cross section the embodiment of the present invention of FIGS. 8 and 9 installed on a building.

Turning now also to FIGS. 8-10, the present invention addresses the foregoing problems by providing spool race 30 on the bottom of track 23 opposite track channel 24. Spool race 30 preferably is an integral part of track 23 and comprises two opposing race walls 31 extending normal to track 23 a spaced distance apart. One or more inwardly extending race lips 33 form race gap 35 and race shelf 37. Spool 40 comprises race flange 41 slidably received within spool race 30 between race shelf 37 and track 23. Extending normal to race flange 41, threaded post 43 mates with collar 45 extending toward spool race 30 from foot flange 47. Foot flange 47 may be rotated to adjust longitudinally to any length within its range the overall length of spool 40 to reach subgirt 5 without the need for shims.

As best seen in FIGS. 8, 9, foot flange 47 articulates between a proximate position adjacent race lip 33 and a distal position extended outwardly from spool race 30. In both positions, collar 45 preferably remains journaled within race gap 35, race lips 33 preferably engaging the sides of collar 45 and thereby stabilizing spool 40. Whereas race flange 41 preferably is rectangular in nature and adapted to fit snugly but slidably between race walls 31 atop race shelf 34, foot flange 47 is round and comprises a diameter considerably larger than the width of race flange 41. Foot flange 47 further includes a knurled edge to make it easier for an installer (not shown) to rotate foot flange 47 and collar 45 relative to threaded post 43. Once the proper extension amount of spool 40 has been achieved, fastener 25 is inserted through track 23 and spool 40 to affix track 23 to subgirt 5 and thus panels 10 to building 1 at that attachment point. Filler strip 17 then may be slid into place to cover the mounting system of panels 10.

Referring again to FIG. 6, one having ordinary skill in the art will recognize that spools 40 of various longitudinal (along axis A) lengths may be utilized as needed for wide variations in surface 4 of wall 2. In most situations, however, and especially in new construction, variations in wall surface 4 don't occur to the exaggerated extent illustrated in FIG. 6, and one size of spool 40 very likely is all that is required. Were a small variation not be within the range of spool 40, a thin shim (not shown) could be inserted between foot flange 47 and subgirt 5 without departing from the spirit and scope of the present invention.

Further, a system of marking spools 40 (not shown) may be included with the present invention to assist in taking advantage of the data produced by scanning system 50. Incremental marks 49 on post 43 separated by standard units may allow the installer (not shown) to dial in a rough extension of spool 40 for each attachment point 52 as directed by scanning system 50. Scanning system 50 may provide a visual map and tabular report of the offsets at each of attachment points 52, enabling the installer to know in advance how much offset is required and to dial it in as he installs each spool 40.

Figure 11:
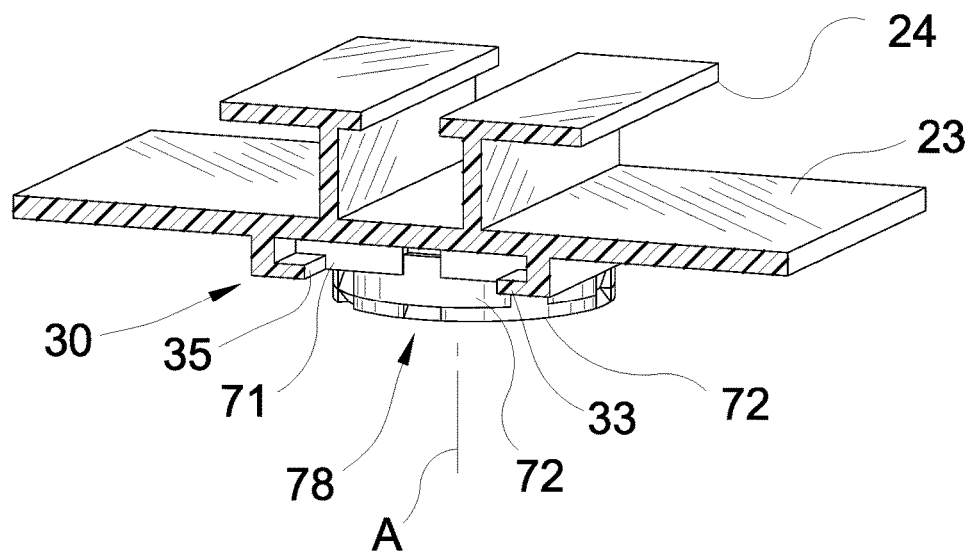
FIGS. 11-12 detail a second particular embodiment of the panel leveling system of the present invention.
Figure 12:
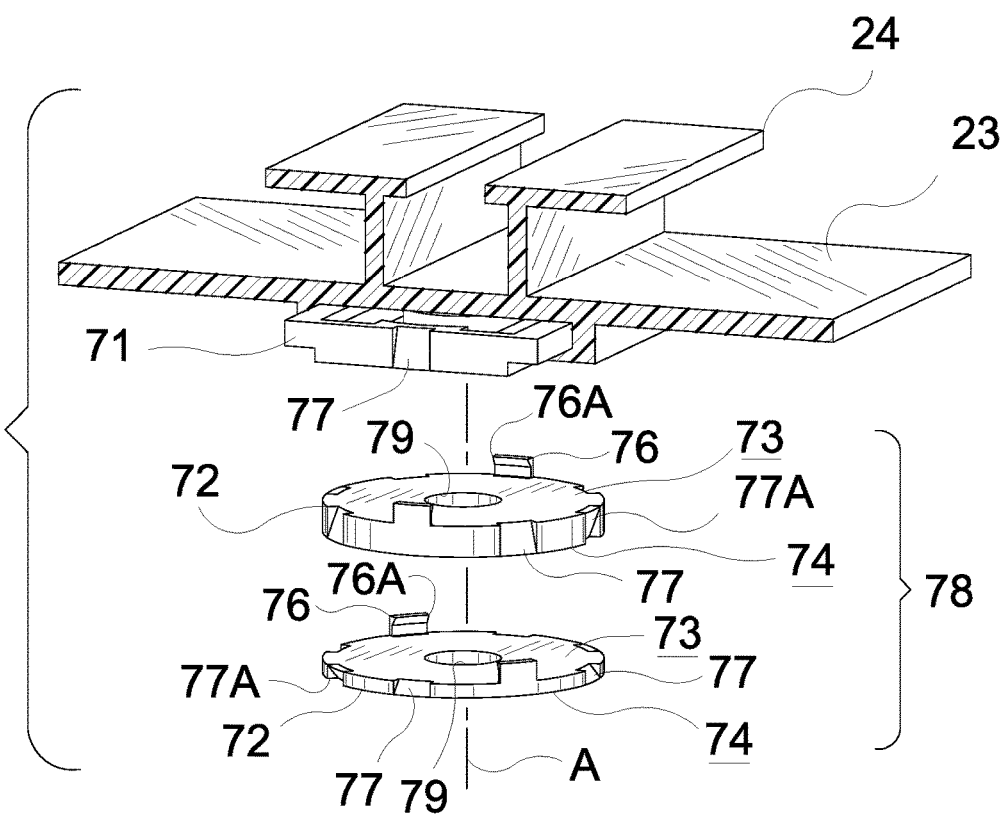
Figure 14B:
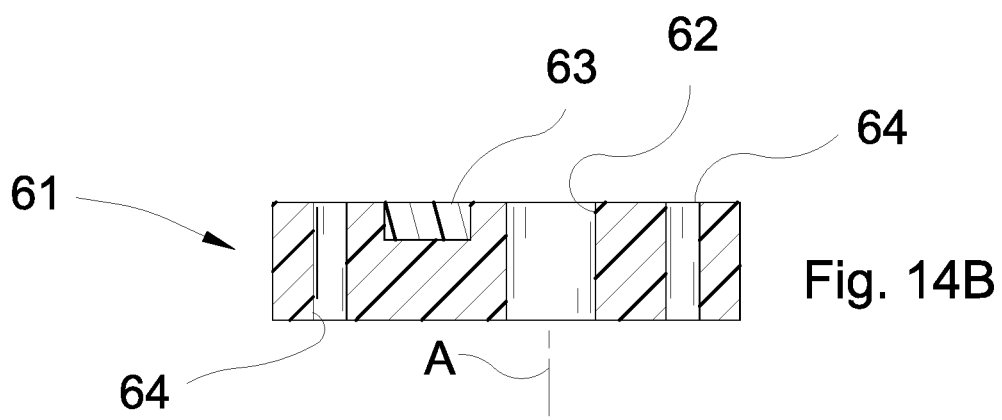
Figure 15A:
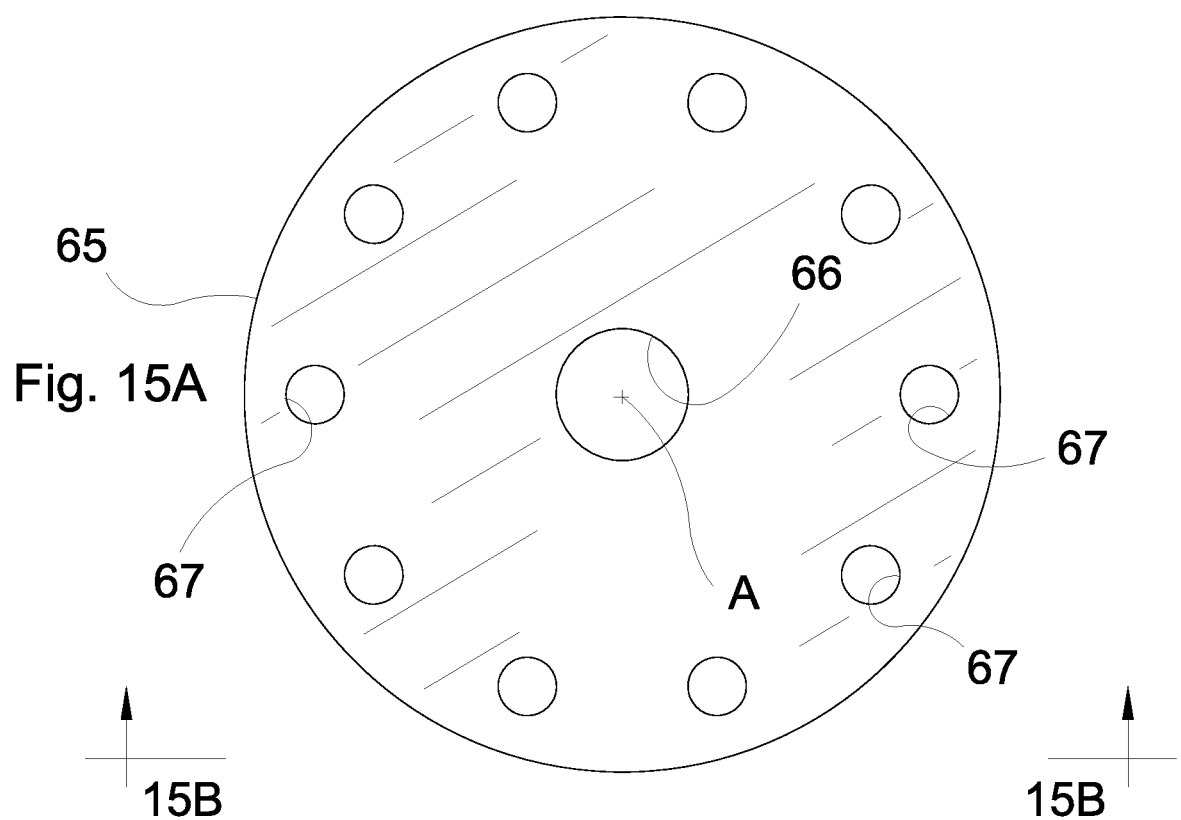
Figure 15B:
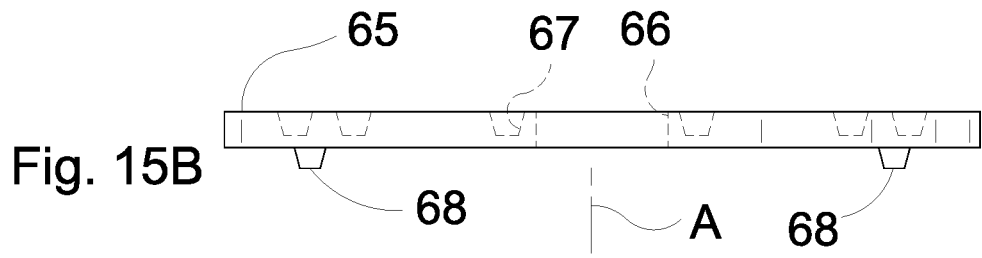

Turning now to FIGS. 11-12, another particular embodiment 70 of the present invention comprises discrete spacer system 70 replacing spool 40 but cooperating with race 30. Slide 71 includes wings 71A which slidably journal within race 30. Slide 71 mates with at least one of a plurality of spacers 72 of varying thicknesses, axially aligned to create a column, or stack 78, of spacers 72 which equals in length the required leveling offset. Stack 78 of spacers 72 couples to slide 71 to hold spacer system 70 in place temporarily until fastener 25 (not shown in FIGS. 11, 12; see FIGS. 4, 5, 10) can be installed.

An installer (not shown) selects as many spacers 72 as needed to achieve the required panel 10 leveling offset, couples them together and to slide 71, as described in more detail below. Preferably, spacers 72 are available to the installer in commonly recognized increments (e.g. 1/16", 1/8", 1/4", 1/2", 1" thicknesses) which may be assembled in any order and quantity to achieve as much precision for the required offset.

Each of spacers 72 includes a pair of opposing tabs 76 arrayed on its perimeter and on opposite sides of axial bore 79 and extending normal to top surface 73 of spacers 72. Each tab 76 includes radially inward-projecting tooth 76A adapted to cooperate with sloped slots 77 on adjacent spacer 72 to affix the top surface 73 juxtaposed to bottom surface 74 of adjacent spacer 72. Once fastener 25 is installed, stack 78 is held in place by compression and no longer relies upon tabs 76 for stability.

Preferably, all tabs 76 extend toward race 30 when stack 78 is assembled, the final spacer 72 proximate slide 71 coupled thereto by its tabs 76. Spacers system 70 can be used without slide 71, however, for example where slide 71 it is not available or where track 23 does not include race 30. In such case, spacer 72 on the proximate end of stack 78 may be reversed (not shown) so that its tabs 76 extend away from track 23 and with its top surface 73 abutting top surface 73 of adjacent spacer 72. Each spacer 72 includes at least one pair of opposing reversed slots 77A for the purpose. Whereas slots 77 slope inwardly from bottom surface 74 to top surface 73 of spacers 72, slots 77A slope inwardly from top surface 73 to bottom surface 74 of spacer 72, thereby presenting a ledge upon which tooth 76A can snap when disk 72 is reversed. See FIGS. 8, 9. Slots 77 and 77A are angularly displaced around the perimeter of each spacer 72 at regular spacing to permit rotation of spacers 72 during installation.

Spacers 72 preferably have an axial diameter sized to permit stack 78 to journal within race gap 35, between lips 33, and thereby to be stabilized by lips 33 as is collar 45 of spool 49. One having ordinary skill in the art will recognize, however, that spacer system 70 may be used in other contexts where such reinforcement and stabilization is not available, without departing from the spirit and scope of the present invention.

Figure 4:
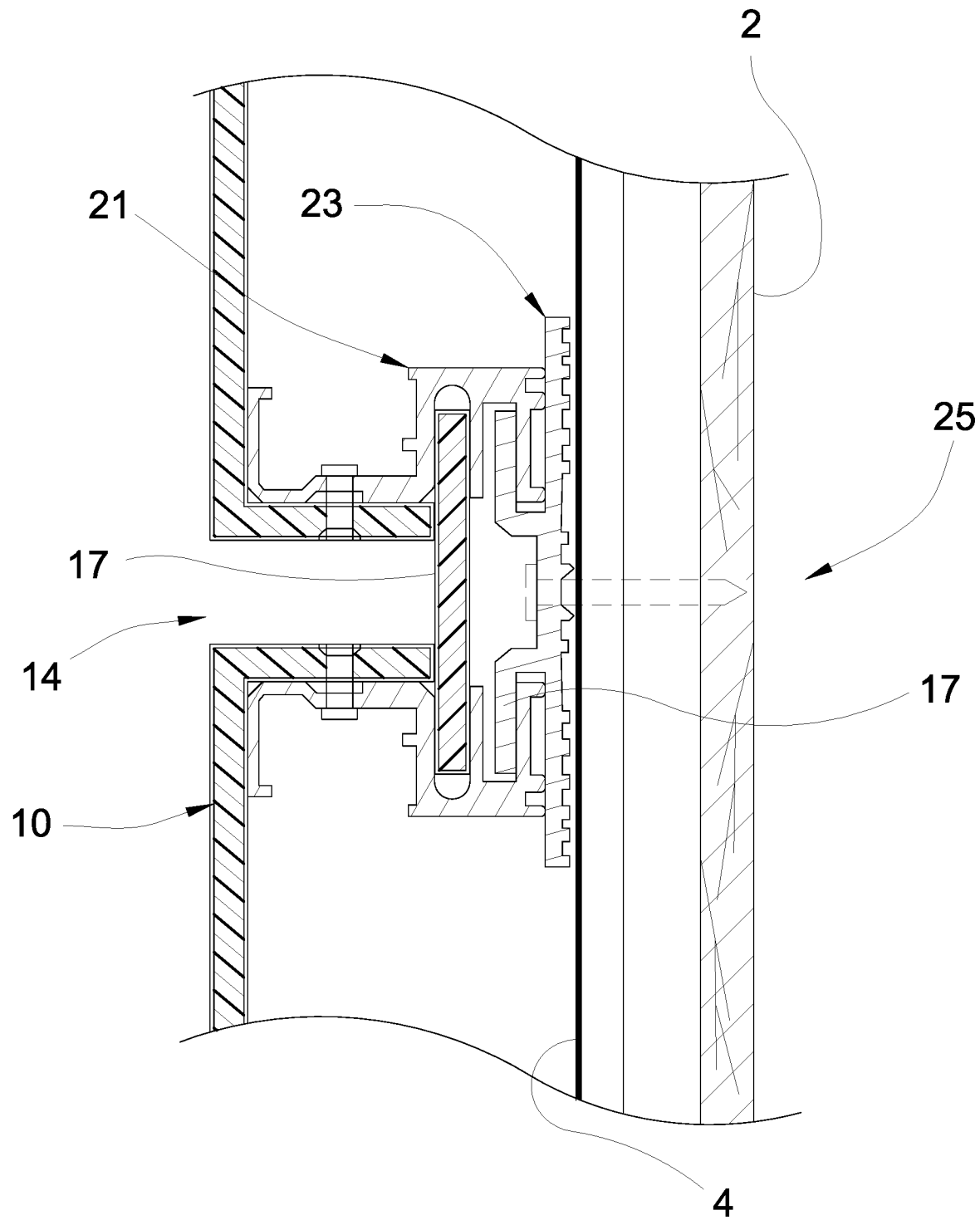
FIGS. 4-5 detail prior art attachment means for the panels shown in FIGS. 1-3C.
Figure 5:
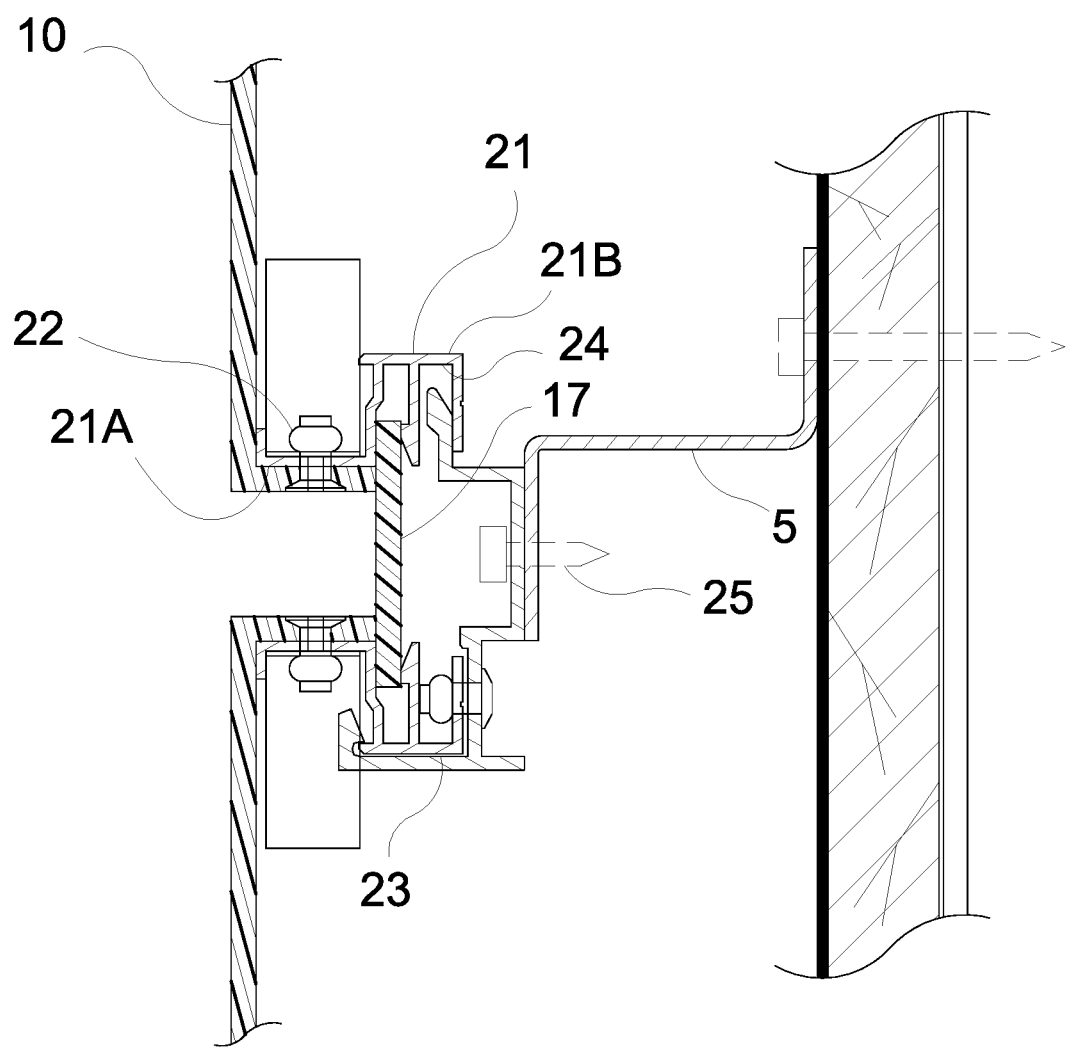

Turning now to FIGS. 13-15B, another particular embodiment 60 of the present invention works with standard panel mounting tracks 23 not equipped with spool races 30 (see generally FIGS. 4, 5). Subgirt 7 in this case comprises a "hat channel" having a broad base 7A, sloping divergent sides 7B and face flanges 7C substantially parallel to base 7A and extending laterally outward from sides 7B. Base 7A is adapted to attach to building 1, or to subgirt brackets 5, with face flanges 7C presented for attachment of panel 10 support system.

Starter base 61 comprises a rectangular block having a substantially pyramidal cross section truncated to produce top base 61A substantially equal to base 7A, base 61 further having sides 61B sloping substantially the same as side surfaces 7B and a thickness substantially the depth of hat channel 7. In other words, starter base 61 is adapted to nest within hat channel 7 and to be transversely stabilized thereby. Magnet 63 disposed within top base 61A of starter base 61 temporarily holds starter base 61 in place and nested within hat channel 7 when placed there by an installer (not shown). Central aperture 62 communicating between starter base 61's top base 61A and parallel bottom base 61C provides a place for fastener 25 (see FIG. 9) to attach panels 10, as described below.

Disposed substantially equidistant from central aperture 62 and near opposite ends of starter base 61, alignment holes 64 are adapted to receive nipples 68 of a first one of shim disks 65 (FIGS. 15A, 15B) placed juxtaposed bottom base 61C of starter base 61 and aligned with central aperture 62. Disks 65 comprise round plates similar to foot flange 47 of spool 40 but having no collar 45 extending normal thereto. Disks 65 preferably are available in a number of thicknesses (as depicted in FIG. 13), and more preferably available in at least the thicknesses of 1/16", 1/8", 1/4" and 1/2". Disks 65 further include fastener hole 66 substantially coextensive with and adapted to be aligned with central aperture 62 of starter block 61.

Arrayed around the perimeter of disks 65 in pairs equidistant on either side of fastener hole 66, nipple detents 67 are disposed the same distance apart as are alignment holes 64 of starter base 61. Protruding from and normal to the opposite surface of disks 65 from alignment holes 64, short nipples 68 are adapted to mate with alignment holes 64 and nipple detents 67 of disks 65. In such manner, any number of disks 65 may be stacked between starter base 61 and track 23 and fastened to building 1 using fastener 25.

Spools 40, spacers 72, slider block 71, disks 65 and block 61 preferably are fabricated form one of a number of available materials sharing traits of geometric stability in various outdoor environments. Suitable materials are ABS and other thermoset plastics, as well as aluminum and other metals. Spools 40, spacers 72, slider block 71, disks 65 and block 61 may be fabricated by several means, such as 3D printing, injection molding or milling.

Different thicknesses for discrete spacers 72 and disks 65 may be indicated by perimeter markings, color coding or other conveniently visible markings (none shown). This permits the installer quickly to perceive the overall length of an assembled, discrete adjustment, such as stack 78, and contrasting such overall length to the data gleaned from scanning system 50 without employing separate measuring means, guessing or trial and error. One having ordinary skill in the art will recognize that all such variations in materials, fabrication methods and thickness indicators are considered to be within the spirit and scope of the present invention.

In operation, an installer (not shown) compiles data for a given wall section from survey system 50 described above and identifies starting location(s) corresponding to attachment points 52. The installer then begins with a row of panels, most likely at the bottom of said wall segment, and proceeds to couple a row of panels 10 in place. At each attachment point 52, he selects a panel 10 leveling device to correct the irregularity of building 1 and installs it between subgirt 5 and track 3, as described below, then secures it with fastener 25. The installer proceeds along an entire row of panels 10 until he has completed the first row. Alternately, the installer may proceed with several rows at once, so long as the panels 10 in a lower row already are in place when installing a panel 10 disposed above it in the next row. At some attachment point 52, the installer will encounter an offset requiring little or no leveling adjustment, that attachment point 52 being the point 52 which defines the plane of panels 10, as discussed above.

When track 23 is equipped with race 30, the installer preferably employs spool leveling system 40. He first journals flange 41 within spool race 30 as described above. The installer rotates spool foot flange 47 until the offset between track 23 and foot flange 47 substantially equals the leveling adjustment offset as indicated by the data from survey system 50, then tightens fastener 25 to affix spool 40 in place.

When using spacer system 70, the installer again consults attachment point data and selects an array of spacers 72 to create a stack 78 thereof which achieves the offset required for each attachment point 52. He then snaps his selection of spacers 72 together using tabs 76 and slots 77, as described above, and to slide 71 which he inserts into race 30 and positions it over attachment point 52. Alternately, if slide 71 is unavailable, or if track 23 doesn't include race 30, or in other situations where slide 71 may be inappropriate, the installer reverses the top spacer 72 of stack 78, as described above, and juxtaposes its bottom surface 74 to track 23. In such case, he may temporarily reverse fastener 25 and insert it coaxially with stack 78 and penetrating channel 23 to hold stack 78 in place. Once track 23 is positioned properly, with stack 78 located at attachment point 52, fastener 25 then can be reversed and used to pin channel 23 to subgirt 5 or other attachment point on building 1 with spacers 72 held in place by the pressure from fastener 25.

When using hat channel subgirt system 7 is in place, shim system 60 may be used in lieu of spool system 40 or spacer system 70. The installer selects a combination of shim disks 65 which produce the required offset as indicated by the data from survey system 50 for a given attachment point 52. The installer then inserts starter block 61 into hat channel 7, mates nipples 68 of a first selected disk 65 with alignment holes 64, and proceeds to place additional shim disks 65 atop the first such shim disk 65 until the required leveling offset has been achieved. The installer then secures track 23 to hat channel 7, through shim system 60, at that point, and proceeds to the next attachment point 52.

While the invention has been particularly shown and described with reference to preferred and alternate embodiments, it will be understood by those skilled in the art that various changes in form and detail may be made therein without departing from the spirit and scope of the invention.

We claim:

1. A panel leveling system for buildings having building walls bearing wall panel systems, the wall panel systems having a subgirt grid attached to the building walls on which a plurality of panels are supported to form a skin for at least a portion of the building, the panel leveling system comprising a panel track, having a building side and a panel side, the panel track being coupled to the panels;

a race disposed on the building side of the panel track and adapted to couple to the subgirt grid, the race having a pair of race walls extending normal to the panel track, each of the race walls terminating in a race lip extending parallel to the panel track to form a race shelf and a race channel, the race lips separated by a race gap;

fastener means for fastening said panel track to said subgirt grid; and a plurality of panel leveling spools coupled between the track and the subgirt grid, each panel leveling spool having a first flange adapted to journal within the race channel and bearing a threaded post extending through the race gap; and a second flange disposed parallel to the first flange and bearing a threaded collar adapted to cooperate with the threaded post to articulate between a proximate second flange position juxtaposed to said race lips and a distal second flange position, said second flange adapted to engage said subgirt grid to affix said panel track a select distance from said subgirt grid.

2. The panel leveling system of claim 1 and further comprising measuring means for measuring said select distance between said proximate second flange position and said distal second flange position.

3. The panel leveling system of claim 2 wherein said measuring means comprises a plurality of incremental marks disposed on said threaded post, each of said incremental marks in sequence becoming visible as said second flange moves from said proximate second flange position toward said distal second flange position.

4. The panel leveling system of claim 3 wherein said first and second flanges and said threaded post and said threaded collar are coaxial and surround and define an axial bore normal to said first and second flanges and receive said fastening means journaled through and coaxial with said bore.

5. The panel leveling system of claim 4 wherein said fastener means comprises
a lag screw extending through said panel track and said axial bore and into said subgirt.

6. A panel leveling system for buildings having building walls bearing wall panel systems, the wall panel systems having a subgirt grid attached to the building walls on which a plurality of panels are supported to form a skin for at least a portion of the building, the panel leveling system comprising
a panel track, having a building side and a panel side, the panel track being coupled to the panels;
a race disposed on the building side of the panel track and adapted to couple to the subgirt grid, the race having
a pair of race walls extending normal to the panel track, each of the race walls terminating in a race lip extending parallel the panel track to form a race shelf and a race channel, the race lips separated by a race gap;
fastener means for fastening said panel track to said subgirt grid; and
a spacer system between the track and the subgirt grid, the spacer system having
a slider block journaled within the rectangular channel and having
a first planar slider block surface disposed adjacent said panel track and an opposite second planar slider block surface substantially flush with said race lips;
a longitudinal length parallel to said race walls and extending between slider block ends;
a transverse width substantially the size of said race gap and defining slider block sides;
wings extending from said slider block sides toward said race walls, said wings cooperating with said race shelf to support said slider block within said race channel; and
tab slots disposed one on each of said slider block ends, said tab slots bearing a tab slot ledge juxtaposed to said second planar slider block surface; and
at least one spacer coupled to said slider block, each of said at least one spacer having
a substantially planar body having a top spacer surface and a bottom spacer surface, said planar body surrounding and defining a central bore having a bore axis, said central bore extending through said planar body between said top and bottom spacer surfaces; and
two tabs disposed on a perimeter of said planar body diametrically opposite each other and extending normal to said top spacer surface parallel to said central bore axis, said tabs being spaced apart a select distance equivalent to said longitudinal length of said slider block;
whereby each of said tabs is adapted to engage said tab slot ledge to affix said at least one spacer to said slider block.

7. The panel leveling system of claim 6 wherein said at least one spacer further comprises at least one pair of tab slots in said perimeter of said planar body, said at least one pair of tab slots adapted to cooperate with said tabs from another one of said at least one spacers to affix said spacers together into a stack of said spacers.

8. The panel leveling system of claim 7 wherein said at least one pair of tab slots further comprises
a second one of said at least one pair of tab slots disposed at an angular displacement from a first one of said at least one pair of tab slots, said second one of said at least one pair of tab slots being reversed, with said tab slot ledges of said second one of said at least one pair of tab slot being juxtaposed said top surface,
whereby said top surface of said another one of said at least one spacers spacer is adapted to be juxtaposed to said top surface of said at least one spacer.

9. A panel leveling system for structures having structure walls bearing wall panel systems, the wall panel systems having a subgirt grid attached to the structure walls on which a plurality of panels are supported to form a skin for at least a portion of the structure, the panel leveling system comprising
a panel track, having a structure side and a panel side, the panel track being coupled to the panels;
a spacer system disposed between said panel track and said subgirt, the spacer system having at least one spacer coupled to said panel track, each of said at least one spacer having
a substantially planar body having a top spacer surface and a bottom spacer surface, said planar body surrounding and defining a central bore having a bore axis, said central bore extending through said planar body between said top and bottom spacer surfaces;
two tabs disposed on a perimeter of said planar body diametrically opposite each other and extending normal to said top spacer surface parallel to said central bore axis; and
at least one pair of tab slots in said perimeter of said planar body, said at least one pair of tab slots adapted to cooperate with said tabs from another one of said at least one spacer to affix said spacers together into a stack of said spacers.

10. The panel leveling system of claim 9 and further comprising
a race disposed on the building side of the panel track, the race having a pair of race walls extending normal to the panel track, each of the race walls terminating in a race lip extending parallel to the panel track to form a race shelf and a race channel, the race lips separated by a race gap;
a slider block journaled within the race channel and having
a first planar slider block surface disposed adjacent said panel track and an opposite second planar slider block surface substantially flush with said race lips;
a longitudinal length parallel to said race walls and extending between slider block ends; and
tab slots disposed one on each of said slider block ends, said tab slots bearing a tab slot ledge juxtaposed to said second planar slider block surface;
whereby the two tabs of said at least one spacer engage said tab slot ledges of said slider block.

11. The panel leveling system of claim 9 wherein said at least one pair of tab slots further comprises
a second one of said at least one pair of tab slots disposed at an angular displacement from a first one of said at least one pair of tab slots, said second one of said at least one pair of tab slots being reversed, with said tab slot ledges of said second one of said at least one pair of tab slot being juxtaposed to said top surface, whereby said top surface of said another one of said at least one spacer is adapted to be juxtaposed to said top surface of said at least one spacer.

12. An improved method of leveling panels mounted to structures, the structures having structure walls bearing wall panel systems, the wall panel systems having a subgirt grid attached to the structure walls on which a plurality of panels are supported to form a skin for a portion of the structure, the improved method comprising providing a panel track, having
a structure side and a panel side, the panel track being coupled to the panels;
a race disposed on the building side of the panel track and adapted to couple to the subgirt grid, the race having
a pair of race walls extending normal to the panel track, each of the race walls terminating in a race lip extending parallel to the panel track to form a race shelf and a race channel, the race lips separated by a race gap;

providing a plurality of leveling spools adapted to couple between the track and the subgirt grid, each spool having
a first flange adapted to journal within the race channel and bearing a threaded post extending through the race gap; and
a second flange disposed parallel to the first flange and bearing a threaded collar adapted to cooperate with the threaded post to articulate between a proximate second flange position juxtaposed to said race lips and a distal second flange position, said second flange adapted to engage said subgirt grid to affix said panel track a select distance from said subgirt grid; and providing fastening means for fastening said panel track to said subgirt with said plurality of leveling spools between said panel track and said subgirt; then for each of said plurality of leveling spools
positioning one of said plurality of leveling spools between said subgirt and said panel track; then
rotating said second flange to displace it from said proximate second flange position toward said distal second flange position a select distance to define a separation between said subgirt and said panel track; then
penetrating said panel track and said one of said plurality of leveling spools with said fastening means and affixing said panel track to said subgirt.

13. A panel leveling system for buildings having building walls bearing wall panel systems, the wall panel systems having a plurality of panels supported by said building walls and forming a skin for at least a portion of the building, the panel leveling system comprising a subgirt grid attached to the building walls, the subgirt grid having a plurality of hat channels, each hat channel having a generally trapezoidal cross section, including a flat hat channel base juxtaposed to said building walls and divergent hat channel walls extending from said hat channel base to terminate in subgirt flanges extending parallel to said base a spaced distance from said building walls;
a plurality of starter blocks adapted to be received within said subgirt grid between said divergent hat channel walls, the starter blocks each further having
a trapezoidal cross section;
a first starter block base adapted to be juxtaposed to said hat channel flat base; and
a second starter block base parallel to said first starter block base and flush with said subgirt flanges;
each starter block surrounding and defining
a central starter block bore extending between said first and second starter block bases and having a bore axis normal to said subgirt grid; and
two starter block apertures within said second starter block base and disposed a spaced aperture distance on opposite sides of said central starter block bore;
at least one spacer disk, each of said at least one spacer disk having
a first planar disk surface and an opposite second planar disk surface;
two nipples extending normal to said first planar disk surface a spaced distance apart equal to said spaced aperture distance;
each one of said at least one spacer disk further surrounding and defining
a central spacer disk bore coaxial with said central starter block bore when said at least one spacer disk is juxtaposed to said starter block with said two nipples received within said two starter block apertures; and
a plurality of spacer disk detents disposed within and arrayed around said second planar disk surface in pairs, said pairs of spacer disk detents being spaced apart a spaced distance equal to said spaced aperture distance, said pairs of spacer disk detents being adapted to receive said two nipples of a second of said at least one spacer disk;
a panel track, having a building side and a panel side, the panel track being coupled to the panels;
a race disposed on the building side of the panel track and adapted to couple to the subgirt grid, the race having a pair of race walls extending normal to the panel track, each of the race walls terminating in a race lip extending parallel the panel track to form a race shelf and a race channel, the race lips separated by a race gap; and
fastener means for fastening said panel track to said subgirt grid.

14. A panel leveling system for structures having structure walls bearing wall panel systems, the wall panel systems having a subgirt grid attached to the structure walls on which a plurality of panels are supported to form a skin for at least a portion of the structure, the panel leveling system comprising a panel track, having a structure side and a panel side, the panel track being coupled to the panels;
a race disposed on the building side of the panel track, the race having a pair of race walls extending normal to the panel track, each of the race walls terminating in a race lip extending parallel to the panel track to form a race shelf and a race channel, the race lips separated by a race gap;
a spacer system disposed between said panel track and said subgirt grid, the spacer system having at least one spacer coupled to said panel track, each of said at least one spacer having
a substantially planar body having a top spacer surface and a bottom spacer surface, said planar body surrounding and defining a central bore having a bore axis, said central bore extending through said planar body between said top and bottom spacer surfaces; and two tabs disposed on a perimeter of said planar body diametrically opposite each other and extending normal to said top spacer surface parallel to said central bore axis; and a slider block journaled within the race channel and having
- a first planar slider block surface disposed adjacent said panel track and an opposite second planar slider block surface substantially flush with said race lips;
- a longitudinal length parallel said race walls and extending between slider block ends; and
- tab slots disposed one on each of said slider block ends, said tab slots bearing a tab slot ledge juxtaposed to said second planar slider block surface;

whereby the two tabs of said at least one spacer engage said tab slot ledges of said slider block.

15. An improved method of leveling panels mounted to structures, the structures having structure walls bearing wall panel systems, the wall panel systems having a subgirt grid attached to the structure walls on which a plurality of panels are supported to form a skin for a portion of the structure, the improved method comprising providing a panel track, having
- a structure side and a panel side, the panel track being coupled to the panels;
- a race disposed on the building side of the panel track and adapted to couple to the subgirt grid, the race having
  - a pair of race walls extending normal to the panel track, each of the race walls terminating in a race lip extending parallel to the panel track to form a race shelf and a race channel, the race lips separated by a race gap;

providing a plurality of panel levelers coupled between the track and the subgirt grid, each of said plurality of panel levelers having;
- a slider block journaled within the race channel and having
  - a first planar slider block surface disposed adjacent said panel track and an opposite second planar slider block surface substantially flush with said race lips;
  - a longitudinal length parallel to said race walls and extending between slider block ends; and
  - slider tab slots disposed one on each of said slider block ends, said slider tab slot bearing a tab slot ledge juxtaposed to said second planar slider block surface;
- at least one spacer coupled to said slider block, each of said at least one spacers having
  - a substantially planar body having a top spacer surface and a bottom spacer surface, said planar body surrounding and defining a central bore having a bore axis, said central bore extending through said planar body between said top and bottom spacer surfaces;
  - two tabs disposed on a perimeter of said planar body diametrically opposite each other and extending normal to said top spacer surface parallel to said central bore axis, said tabs being spaced apart a select distance equivalent to said longitudinal length of said slider block;
  - at least one pair of tab slots in said perimeter of said planar body, said at least one pair of tab slots adapted to cooperate with said tabs from another one of said at least one spacers to affix said spacers together into a stack of said spacers; and providing fastening means for fastening said panel track to said subgirt grid with said panel levelers between said panel track and said subgirt grid; then positioning one of said panel levelers between said subgirt grid and said panel track; then configuring said panel levelers to define a separation between said subgirt grid and said panel track by selecting one of said at least one spacer; and coupling said one of said at least one spacer with said slider block by engaging said two tabs to said slider tab slots; then penetrating said panel track and said panel levelers with said fastening means and affixing said panel track to said subgirt grid.

16. The improved method of claim 15 wherein the configuring step further comprises selecting a plurality of said at least one spacer; and coupling each of said plurality of said at least one spacer together by engaging said two tabs to said slider tab slots to form a stack of said at least one spacer of a select.

\* \* \* \* \*